Figure 24:
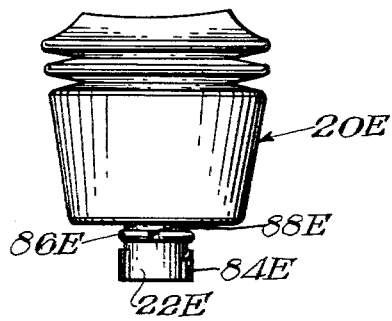

May 24, 1966  J. P. BRODERICK ETAL  3,252,628
FLAME SPRAYING TORCH
Filed Dec. 5, 1963  4 Sheets-Sheet 1
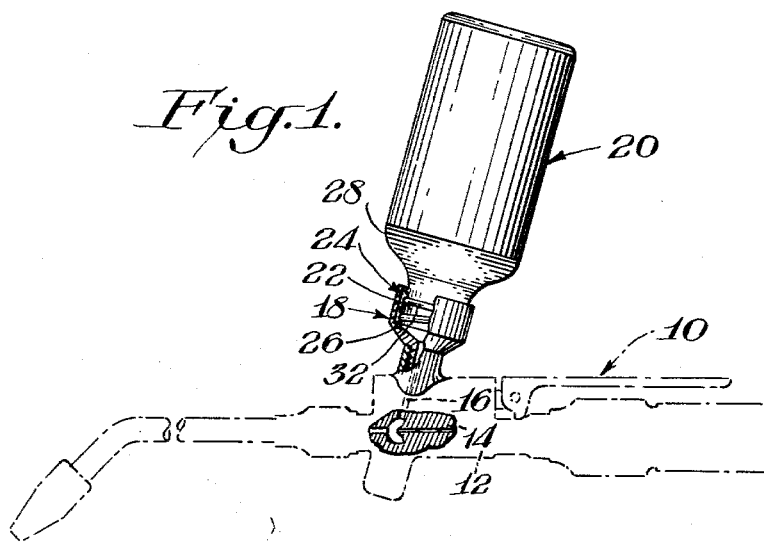
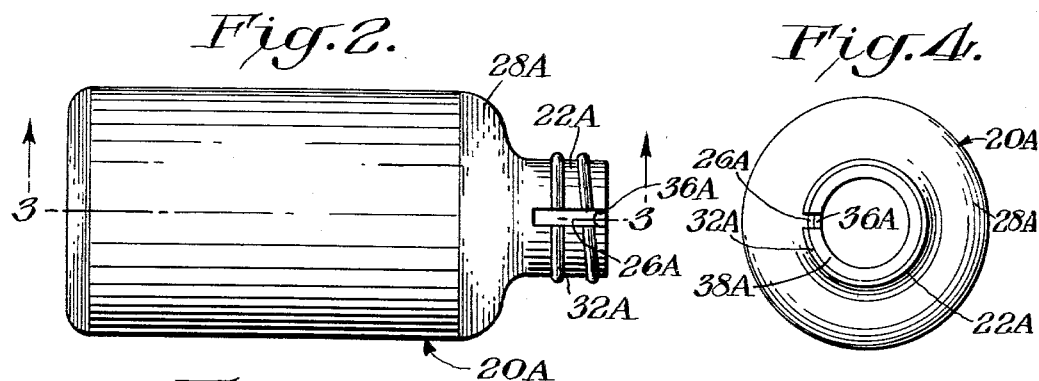
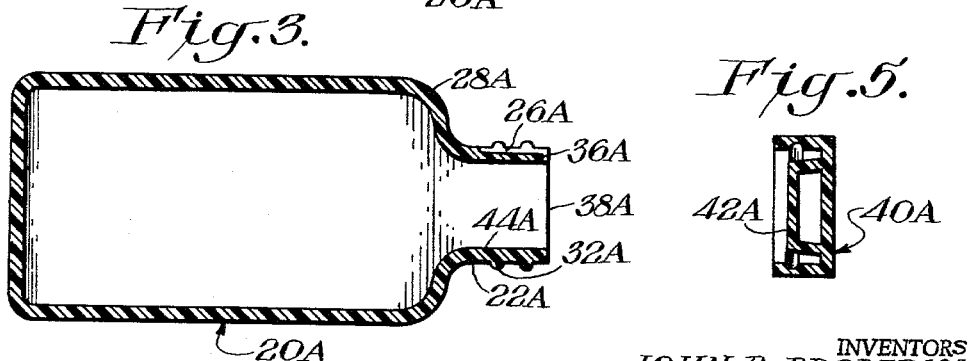
INVENTORS
JOHN P. BRODERICK
FREDERICK T. WISHNIE
DON L. KEYS
FRANCIS X. NEARY
BY Connolly and Hutz
ATTORNEYS May 24, 1966  J. P. BRODERICK ET AL  3,252,628
FLAME SPRAYING TORCH
Filed Dec. 5, 1963  4 Sheets-Sheet 2
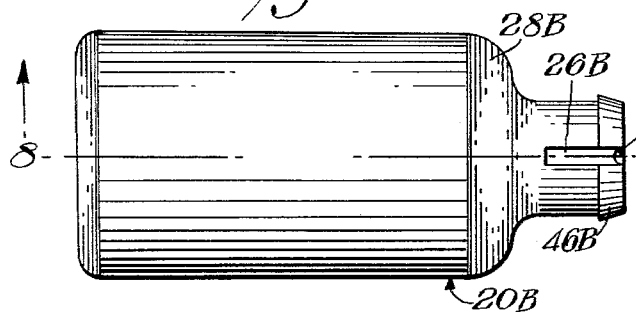
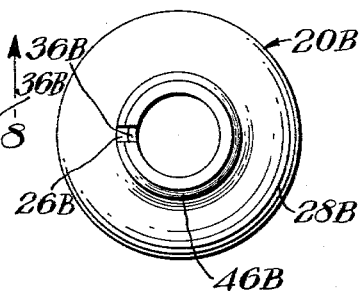
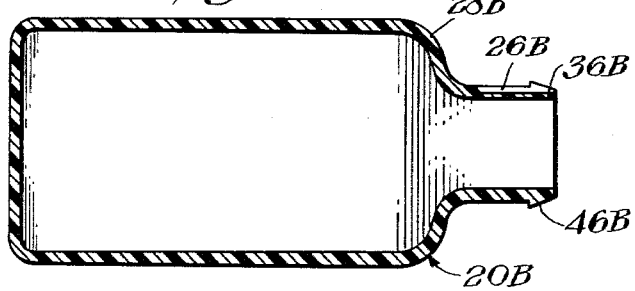
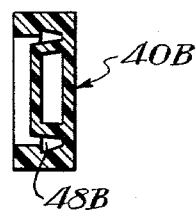
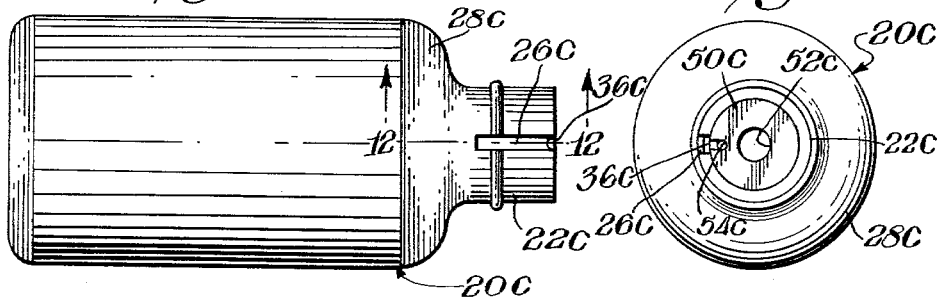
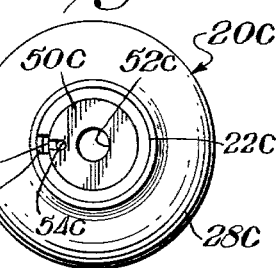
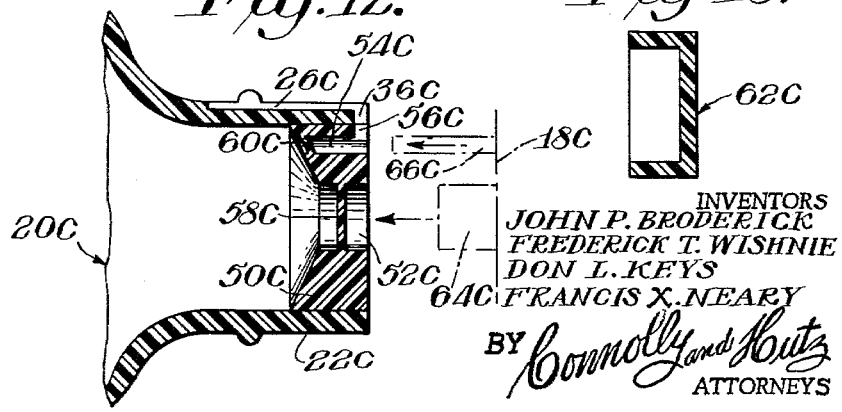
INVENTORS
JOHN P. BRODERICK
FREDERICK T. WISHNIE
DON L. KEYS
FRANCIS X. NEARY
BY Connolly and Hutz
ATTORNEYS May 24, 1966 J. P. BRODERICK ET AL 3,252,628
FLAME SPRAYING TORCH
Filed Dec. 5, 1963 4 Sheets-Sheet 3
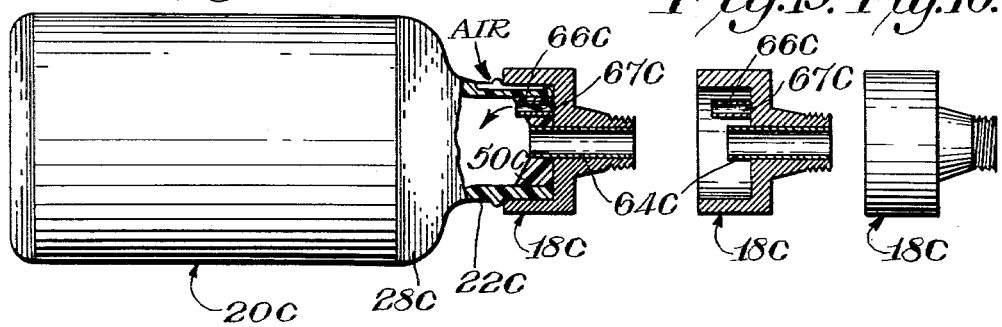
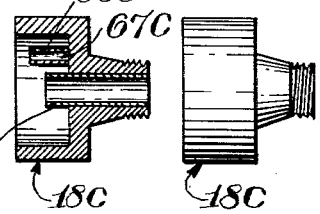
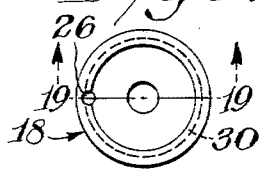
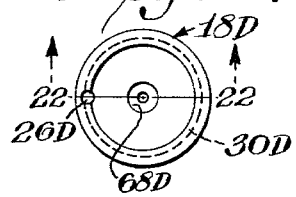
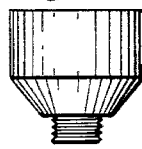
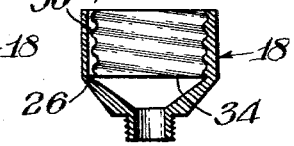
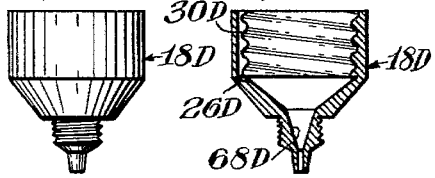
INVENTORS
JOHN P. BRODERICK
FREDERICK T. WISHNIE
DON L. KEYS
FRANCIS X. NEARY
BY Connolly and Hutz
ATTORNEYS May 24, 1966  J. P. BRODERICK ET AL  3,252,628
FLAME SPRAYING TORCH Filed Dec. 5, 1963  4 Sheets-Sheet 4

INVENTORS
JOHN P. BRODERICK
FREDERICK T. WISHNIE
DON L. KEYS
FRANCIS X. NEARY
BY Connolly and Hutz
ATTORNEYS

United States Patent Office 3,252,628
Patented May 24, 1966

3,252,628
FLAME SPRAYING TORCH
John P. Broderick, Bayside, Frederick T. Wishnie, Seaford, Don L. Keys, Huntington, and Francis X. Neary, Port Washington, N.Y., assignors to Eutectic Welding Alloys Corporation, Flushing, N.Y., a corporation of New York
Filed Dec. 5, 1963, Ser. No. 329,611
10 Claims. (Cl. 222—193)

This application is a continuation-in-part of prior copending commonly assigned patent application S.N. 309,502, filed September 17, 1963, now abandoned, by these same inventors.

This invention relates to a powder-feeding coupling for a flame spraying torch, and it more particularly relates to such a coupling for a combination powder feeding and storage container.

Various torches have been proposed for injecting powders into the stream of burning gas emitted from a torch for coating and fusing them upon a surface. These torches, such as the one described in copending commonly assigned U.S. patent application Serial No. 286,343, filed June 7, 1963, now U.S. Patent No. 3,190,560, feed the powders into the stream of gas from a powder container mounted upon the torch. These containers usually include an orifice disposed above the level of the powder for allowing air to flow into them as powder flows out to prevent a negative pressure from being formed in the container and interfering with the dependable free flow of powder from it. It is convenient to also use such containers for storage when all powder is not dispensed by removing them from the torch and storing them in a position inverted from that in which they are torch mounted. This requires sealing the orifice by removable means such as a plug or tape. However these removable seals are inconvenient and easy to lose which causes considerable powder spillage.

An object of this invention is to provide a simple, economical and dependable means for allowing air to flow into a powder dispensing container without puncturing its body.

In accordance with this invention an air passage extends through the engaged portions of a coupling means such as a bayonet type coupling or screw threads which connect the neck of a powder dispensing container to the powder injecting section of a flame spraying torch. Even though this passage is disposed below the level of the powder in the container, in some way not completely understood, air enters through it and finds it way above the level of the powder to prevent negative pressure from being formed in the container and interfering with the free flow of powder from it. This passage may be merely a loose fit within the coupling or an actual slot may be formed either in the outside wall of the neck of the container or within the inside wall or base of the connector cup within which it is inserted. When it is formed in the cup, the neck may have a peripherally complete coupling formed on its outer surface such as a screw thread or resilient locking protuberances. When the slots are formed in the outside of the necks of the containers, the part of the coupling within the cup may be circumferentially complete. When the slot is in the outside of the neck, the end of the neck communicating with the slot is notched to facilitate the flow of air even if the end should seat within a connector cup. Puncturable diaphragms may be provided within powder feeding and air conducting holes within plugs mounted in the necks of containers having slots in their outer walls to positively seal them prior to use. In conjunction with a bayonet type coupling a concentric ring upon the neck engages the outer edge of the cup to firmly support it, and a slot extends through the ring to permit air to pass through it.

Figure 25:
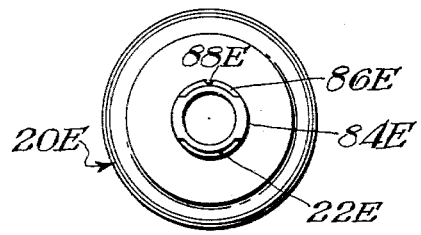
Figure 28:
Figure 29:
Figure 23:
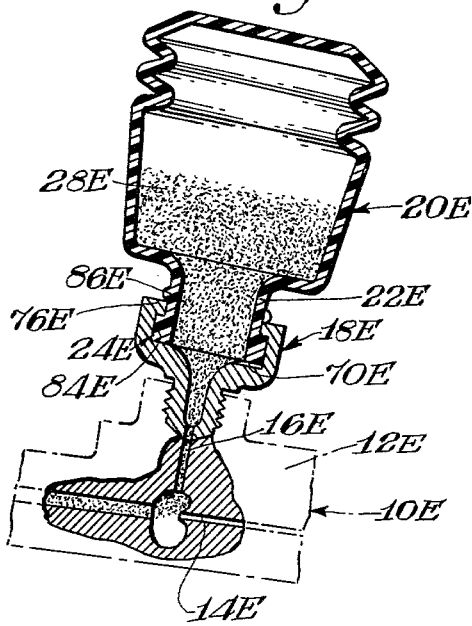
Figure 26:
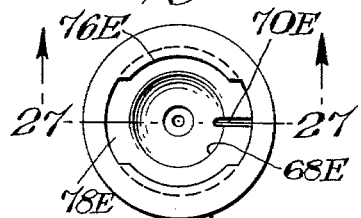
Figure 27:
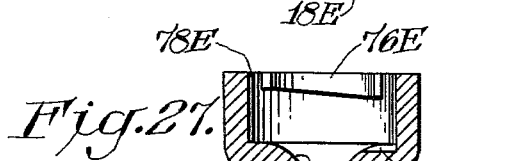

Novel features and advantages of the present invention will become apparent to one skilled in the art from a reading of the following description in conjunction with the accompanying drawings wherein similar reference characters refer to similar parts and in which:

FIG. 1 is a side-elevational view partly broken away in cross section of one embodiment of this invention mounted upon a flame spraying torch shown in phantom outline;
FIG. 2 is a side view in elevation of another embodiment of this invention;
FIG. 3 is a cross-sectional view taken through FIG. 2 along the line 3—3;
FIG. 4 is an end view of the embodiment shown in FIG. 2;
FIG. 5 is a cross-sectional view of a plug for use in conjunction with the embodiment shown in FIGS. 2–5;
FIG. 6 is a side-elevational view of another embodiment of this invention;
FIG. 7 is an end-elevational view of the embodiment shown in FIG. 6;
FIG. 8 is a cross-sectional view taken through FIG. 6 along line 8—8;
FIG. 9 is a cross-sectional view taken through a cap for use in conjunction for the embodiment shown in FIG. 8;
FIG. 10 is a view in elevation of a further embodiment of this invention;
FIG. 11 is an end view of the embodiment shown in FIG. 10;
FIG. 12 is a cross-sectional view taken through FIG. 10 along the line 12—12;
FIG. 13 is a cross-sectional view of a cap for use in conjunction with the embodiment shown in FIG. 12;
FIG. 14 is a view in elevation partially broken away in cross section of the embodiment shown in FIGS. 10–12 engaged with a connector for mounting upon the powder injecting section of a flame spraying torch;
FIGS. 15 and 16 are respectively cross-sectional and elevational views of the cup shown in FIG. 15;
FIG. 17 is a plan view of the cup shown in FIG. 1;
FIG. 18 is a view in elevation of the cup shown in FIG. 17;
FIG. 19 is a cross-sectional view taken through FIG. 17 along the line 19—19;
FIG. 20 is a plan view of another form of the cup shown in FIG. 1;
FIG. 21 is a view in elevation of the cup shown in FIG. 20;
FIG. 22 is a cross-sectional view taken through FIG. 20 along the line 22—22;
FIG. 23 is a cross-sectional view in elevation of still a further embodiment of this invention;
FIGS. 24 and 25 are respectively elevational and bottom-plan views of the container portion of the embodiment of FIG. 23;
FIG. 26 is a top-plan view of the cup portion of the embodiment of FIG. 23;
FIG. 27 is a cross-sectional view taken through FIG. 26 along the line 27—27; and
FIGS. 28 and 29 are respectively elevational and bottom-plan views of a capped plug for sealing the container of FIGS. 24 and 25.

In FIG. 1 is shown a flame spraying torch 10 including a powder injecting section 12. A longitudinal gas conducting passageway 14 extends through section 12, and a powder supplying channel 16 extends from within connector cup 18 upon powder injection section 12 to its intersection with longitudinal gas conducting passageway 14. Container 20 is mounted upon connector 18 with its neck 22 engaged by coupling means 24 within connector 18. Coupling means 24 is for example mutually engaging screw threads.

A slot 26 extends through coupling means 24 for permitting atmospheric air to pass from outside of coupling means 24 through it and into container 20 wherein it replaces dispensed powder 28 to facilitate its flow therefrom. Slot 26 is formed within connector 18 shown in detail in FIGS. 17–19 in the form of a longitudinal end-milled hole 26 passing through internal threads 30 of connector 18. This permits circumferentially couplet screw threads 32 to be formed upon neck 22 of container 20. For reasons that are not completely understood, air can readily flow through and about end-milled hole 26 which is shown in FIG. 19 to extend past shoulder 34, which defines the lower limit of travel for the end of the neck 22, into the air above the level of powder 28 in container 20 without allowing the powder to spill up and out of hole 26.

In FIGS. 2–4 is shown another form of this invention in which slot 26A is formed in the neck 22A of container 20A. Slot 36A is disposed in the outer end of neck 22A in communication with slot 26A for facilitating the flow of air into container 20A even if the bottom end 38A of container 20A were seated upon a surface within connector 18. Container 20A as well as the other containers shown herein are conveniently made of a resilient plastic such as polyethylene.

A convenient cap 40A for sealing the open neck of container 20A when it is detached from connector 18 is shown in FIG. 5. It includes an internal tapered plug 42A for insertion within the inside surface 44A of neck 22A for sealing powder within the container when it is removed from torch 10. Plug 42A seals the container even though its end includes notch 36A.

In FIGS. 6–9 is shown a container 20B which is similar to container 20A with the exception that the means for coupling it to within connector 18 is comprised of a tapered resilient circumferential protuberance 46B which engages within a corresponding annular recess (not shown) in coupling 18B (also not shown) similar to recess 48B in cap 40B. Container 20B accordingly is coupled to connector 18 by a resilient snap-fit instead of screw threads 32.

In FIGS. 10–16 is shown another container 20C which is an embodiment of this invention in which neck 22C is engaged by a press fit within cup 18C shown in FIGS. 14–16. An internal plug 50C is inserted in neck 22C, and it includes a central powder feeding orifice 52C and a side air-conducting orifice 54C. Orifice 54C communicates with slot 26C on the outside of neck of 22C through notch 56C in the edge of internal plug 50C for conducting air through slot 26C to air-conducting hole 54C. Diaphragms 58C and 60C are respectively provided in holes 52C and 54C for positively sealing powder within container 20C prior to use. A cap 62C which engages about the outside of neck 22C conveniently seals the container both prior to puncturing and after puncturing as described.

In FIG. 14 connector 18C is engaged with neck 22C by forcing it in the direction (schematically shown in FIG. 12) to cause tubes 64C and 66C to respectively puncture diaphragms 58C and 60C to permit powder and air to respectively flow through them as previously described. Hole 67C in the base of tube 66C communicates with notch 56C. Container 20C is therefore automatically punctured when it is engaged with connector 18C, which in FIGS. 14–16 is shown removed from the torch for convenience of illustration.

FIGS. 20–22 show another form 18D of the connector shown in FIGS. 17–19 in which a funnel-shaped aperture 68D is provided within the lower portion of the connector 18 for smoothly guiding powder into powder supplying passageway 16 without any rectangular shoulders which might trap powder and interfere with its free flow.

In FIG. 23 is shown still a further embodiment of this invention in which a coupling 24E of the bayonet type connects container 20E to cup 18E as shown in FIGS. 24–27. Bayonet coupling 24E includes external bayonet lugs 84E on neck 22E of container 20E and internal bayonet lugs 76E within cup 18E. The engaging surfaces of the external and internal bayonet lugs are cooperatively tapered to snugly engage them with each other and the neck 22E of container 20E within cup 18E. Bayonet type coupling 24E is usually loose enough to permit air to pass through it to prevent an undue reduction in pressure within container 20E as powder 28E is discharged through passage 16E into gas-conducting passage 14E as torch 10E is operated. This is especially true when container 20E is of the type having a movable wall which is illustrated in which the movable wall moves inwardly upon removal of contents to prevent an undue decrease of pressure therein. Such a container is described and claimed in copending application for U.S. Letters Patent Serial No. 314,763, filed October 8, 1963, now abandoned. However to avoid any restriction whatsoever upon the feeding of the last portions of powder 28E within container 20E, a small slot 70E is provided in the base of cup 18E to provide a very small controlled leakage of air into container 20E. This leakage of air is so slight that it does not substantially alter the sealed character of container 20E, but it facilitates the flow of the last portions of powder from it. The same might be accomplished by merely a loose fit, but the provision of slot 70E makes it absolutely certain that an accidental complete seal might not restrict the last portions of powder flowing out of the container.

A ring 86E is concentrically disposed on neck 22E of container 20E a short distance from external bayonet lugs 84E. Ring 86E engages the upper surface of cup 18E to maintain container 20E firmly and squarely engaged with it. Slot 88E is provided in ring 86E for insuring that air flows through it and thence through coupling 24E.

Cup 18E is removably secured to section 12E by screw threads 82E upon the lower end 80E of cup 18E. A smooth funnel-shaped exit 68E is provided within cup 18E for insuring the smooth flow of powders into powder supplying channel 16E.

Cap plug 40E shown in FIGS. 28 and 29 is provided for sealing container 20E when it is removed from the torch. It includes a tapered plug 42E for insertion within neck 22E, and it firmly and securely seals container 20E from the atmosphere during storage and prevents loss of contents. Plug 40E and the substantially sealed nature of the container during discharge afforded by only the slight leakage of air through the loose coupling 24E maintains the contents of container 20E substantially protected from atmospheric moisture and corrosion during storage and use.

What is claimed is:
1. A powder-injecting section for a flame spraying torch comprising a longitudinal gas-passageway through said section, a connector upon said section, a powder supplying channel in said section extending from within said connector to said logitudinal gas-conducting passageway, a powder container engaged with said connector for supplying powder to said powder supplying channel, coupling means engaging said container with said connector; said coupling means incorporating an air passage extending through it for permitting atmospheric air to pass from outside of said coupling means through it and into said container whereby it replaces powder dispensed from said container to facilitate the flow therefrom, said air passage comprising a slot extending through said coupling means, said connector including a cup upon said section, said container including a neck inserted within said cup, said coupling means engaging the outside of said neck within the inside of said cup, said slot being disposed upon said inside of said cup, and the portion of said coupling means upon said container being peripherally complete.

2. A powder-injecting section for a flame spraying torch comprising a longitudinal gas-conducting passageway through said section, a connector upon said section, a powder supplying channel in said section extending from within said connector to said longitudinal gas-conducting passageway, a powder container engaged with said connector for supplying powder to said powder-supplying channel, coupling means engaging said container with said connector, said coupling means incorporating an air passage extending through it for permitting atmospheric air to pass from outside of said coupling means through it and into said container whereby it replaces powder dispensed from said container to facilitate the flow therefrom, said coupling means comprising a bayonet type connecting means including a cup upon said section, said container including a neck inserted within said cup, said bayonet type connecting means including external bayonet lugs upon the outer end of said neck and internal bayonet lugs within said cup, a ring being concentrically disposed upon said neck a short distance within said bayonet lugs for engaging the outer edge of said cup to maintain said container firmly supported upon it, and a slot extending through said ring for permitting air to pass through it.

3. A powder-injecting section for a flame spraying torch comprising a longitudinal gas-conducting passageway through said section, a connector upon said section, a powder supplying channel in said section extending from within said connector to said longitudinal gas-conducting passageway, a powder container engaged with said connector for supplying powder to said powder-supplying channel, coupling means engaging said container with said connector, said coupling means incorporating an air passage extending through it for permitting atmospheric air to pass from outside of said coupling means through it and into said container whereby it replaces powder dispensed from said container to facilitate the flow therefrom, said coupling means comprising a bayonet type connection, a slot being provided in the base of said cup for insuring that some air passes between the abutting edge of said neck and the adjacent surface of said cup.

4. A flame spraying torch comprising a flame ejecting tip, a powder injecting section connected to said tip, gas connecting means connected to said powder injecting section, a gas conduit communicating with said connecting means and extending through said powder injecting section and said tip, a powder container having a front discharge face and side and back walls, said container being free of internal tubes, said side and back walls of said container being imperforate, a cup upon said section, coupling means connecting said powder container to the inside of said cup, with said container disposed in an inverted position, a powder supplying channel leading from said discharge face of said container to said conduit whereby the powder may flow from said container into said conduit, and air passage means in said coupling means communicating with the atmosphere at a point above the area of connection of said container with said cup and leading to the interior of said container to constantly maintain said interior of said container in communication with the atmosphere.

5. A torch as set forth in claim 4 wherein said air passage means comprises a slot extending through said coupling means upon the internal surface of said cup.

6. A torch as set forth in claim 4 wherein said air passage means comprises a slot extending through said coupling means.

7. A torch as set forth in claim 6 wherein the portion of said coupling means within said cup is peripherally complete, said container having a neck within said cup, and said slot is disposed upon the outside of said neck of said container.

8. A torch as set forth in claim 7 wherein said coupling means comprises internal threads upon said cup and external threads upon said neck of said container.

9. A torch as set forth in claim 4 wherein said coupling means comprises a bayonet type connection.

10. A torch as set forth in claim 9 wherein said container includes a neck inserted within said cup, and said bayonet type connecting means including external bayonet lugs upon the outer end of said neck and internal bayonet lugs within said cup.

References Cited by the Examiner

UNITED STATES PATENTS

| | | | |
|---|---|---|---|
| 803,590 | 11/1905 | Herb. | |
| 1,998,646 | 4/1935 | Yager. | |
| 2,743,913 | 5/1956 | Gundlach | 239—379 X |
| 2,784,882 | 3/1957 | Du Bois | 222—215 |
| 2,786,779 | 3/1957 | Long et al. | 239—85 X |
| 2,961,129 | 11/1960 | Bullock | 222—193 |
| 3,074,600 | 1/1963 | Warhurst | 222—193 |

FOREIGN PATENTS 462,361  1/1950  Canada.

RAPHAEL M. LUPO, *Primary Examiner.*

LOUIS J. DEMBO, S. H. TOLLBERG,
*Assistant Examiners.*